US012519723B2

United States Patent
Xu (10) Patent No.: US 12,519,723 B2
(45) Date of Patent: Jan. 6, 2026

(54) PACKET TRANSMISSION METHOD AND ELECTRONIC DEVICE

(71) Applicant: HUAWEI TECHNOLOGIES CO., LTD., Guangdong (CN)

(72) Inventor: Bingkun Xu, Xi'an (CN)

(73) Assignee: Huawei Technologies Co., LTD., Shenzhen (CN)

( * ) Notice: Subject to any disclaimer, the term of this patent is extended or adjusted under 35 U.S.C. 154(b) by 382 days.

(21) Appl. No.: 18/007,389

(22) PCT Filed: Jul. 27, 2021

(86) PCT No.: PCT/CN2021/108684
§ 371 (c)(1),
(2) Date: Jan. 30, 2023

(87) PCT Pub. No.: WO2022/022512
PCT Pub. Date: Feb. 3, 2022

(65) Prior Publication Data
US 2023/0283552 A1 Sep. 7, 2023

(30) Foreign Application Priority Data

Jul. 31, 2020 (CN) .......................... 202010758606.7

(51) Int. Cl.
*H04L 45/74* (2022.01)
*H04L 12/46* (2006.01)

(52) U.S. Cl.
CPC .......... *H04L 45/74* (2013.01); *H04L 12/4633* (2013.01)

(58) Field of Classification Search
None
See application file for complete search history.

(56) References Cited

U.S. PATENT DOCUMENTS

| 11,128,438 B1 * | 9/2021 | Konda ................ H04L 63/0263 |
| 2017/0063927 A1 | 3/2017 | Schultz et al. |
| 2017/0272554 A1 | 9/2017 | Kwan et al. |

FOREIGN PATENT DOCUMENTS

| JP | 2002358253 A | 12/2002 |
| JP | 2019208219 A | 12/2019 |

OTHER PUBLICATIONS

Extended European Search Report in European Appln No. 21849314.6, dated Dec. 19, 2023, 9 pages.
International Search Report and Written Opinion in International Appln. No. PCT/CN2021/108684, mailed on Sep. 29, 2021, 17 pages (with English translation).
Office Action in Japanese Appln. No. 2023-506360, mailed on May 7, 2024, 7 pages (with English translation).

* cited by examiner

*Primary Examiner* — Christine T Duong
(74) *Attorney, Agent, or Firm* — Fish & Richardson P.C.

(57) ABSTRACT

Embodiments of the present disclosure provide a method for packet transmission and an electronic device. In an example method, an internet of things (IoT) device can generate a first internet protocol (IP) packet, where a destination address in a packet header of the first IP packet is an IP address of a central device instead of an IP address of a target device. The IoT device may encapsulate the IP address of the target device into a packet body of the first IP packet. In this way, the central device may determine, according to a firewall rule of the IoT device, whether to send the first IP packet to the target device, and the central device may be used as a firewall device.

19 Claims, 5 Drawing Sheets

| Packet header | Packet body |
|---|---|
| SA: IP address of an IoT device<br>DA: IP address of a target device | Raw data |

FIG. 4

| Packet header | Packet body | |
|---|---|---|
| | Encapsulated IP data | |
| SA: IP address of an IoT device<br>DA: IP address of a central device | SA: tunnel IP address of the IoT device<br>DA: IP address of a target device | Raw data |

FIG. 5

| Packet header | Packet body |
|---|---|
| SA: IP address of a central device<br>DA: IP address of a target device | Raw data |

PACKET TRANSMISSION METHOD AND ELECTRONIC DEVICE

CROSS-REFERENCE TO RELATED APPLICATIONS

This application is a national stage of International Application No. PCT/CN2021/108684, filed on Jul. 27, 2021, which claims priority to Chinese Patent Application No. 202010758606.7, filed on Jul. 31, 2020. Both of the aforementioned applications are hereby incorporated by reference in their entireties.

TECHNICAL FIELD

This application relates to the communication field, and more specifically, to a packet transmission method and an electronic device in the communication field.

BACKGROUND

As the internet of things (internet of things, IoT) develops, and IoT devices increase, most IoT devices have low security capabilities and are likely to be attacked. To prevent an IoT device from being attacked, a dedicated firewall device needs to be purchased, but costs of the firewall device are high.

SUMMARY

Embodiments of this application provide a packet transmission method and an electronic device, to ensure security of an IoT device at low costs.

According to a first aspect, this application provides a packet transmission method. The method may be performed by an IoT device, and the IoT device may be an apparatus, for example, a chip system, that can support the IoT device in implementing a function required by the method. The method includes: The IoT device generates a first internet protocol (internet protocol, IP) packet, where a destination address in a packet header of the first IP packet is an IP address of a central device, and a destination address in a packet body of the first IP packet is an IP address of a target device; and the IoT device sends the first IP packet to the central device based on the IP address of the central device, where the central device is configured to forward the first IP packet to the target device according to a firewall rule of the IoT device.

In the foregoing solution, the IoT device can generate the first IP packet, and the destination address in the packet header of the first IP packet is the IP address of the central device instead of the IP address of the target device. The IoT device may encapsulate the IP address of the target device into the packet body of the first IP packet. In this way, the central device may determine, according to the firewall rule of the IoT device, whether to send the first IP packet to the target device, and the central device may be used as a firewall device, to avoid purchasing a dedicated firewall device for the IoT device. This can reduce costs and ensure security of the IoT device.

The IoT device does not have a firewall capability, the central device has the firewall capability, and the central device is configured with the firewall rule of the IoT device.

In some possible implementations, before the IoT device generates a first internet protocol IP packet, the method further includes: The IoT device receives a second IP packet from the central device, where a source address in a packet header of the second IP packet is the IP address of the central device; and the IoT device obtains the IP address of the central device based on the packet header of the second IP packet.

In this way, the IoT device may generate the first IP packet based on the IP address of the central device obtained from the packet header of the second IP packet.

In some possible implementations, before the IoT device generates a first internet protocol IP packet, the method further includes: The IoT device receives a second IP packet from the central device, where a packet body of the second IP packet includes an IP configuration, and the IP configuration includes the IP address of the central device; and the IoT device obtains the IP address of the central device based on the IP configuration in the packet body of the second IP packet.

In this way, the IoT device may generate the first IP packet based on the IP address of the central device obtained from the packet body of the second IP packet.

In some possible implementations, the IP configuration further includes a tunnel identifier used to establish a tunnel between the IoT device and the central device, and the method further includes: The IoT device establishes the tunnel between the IoT device and the central device based on the tunnel identifier.

That the IoT device sends the first IP packet to the central device based on the IP address of the central device includes: The IoT device sends the first IP packet to the central device based on the IP address of the central device through the tunnel.

In the foregoing technical solution, the IoT device and the central device may transmit the first IP packet through the tunnel, helping improve security.

In some possible implementations, the tunnel identifier is used to indicate a tunnel IP address of the IoT device and a tunnel IP address of the central device, and the packet body of the first IP packet includes the tunnel IP address of the IoT device.

In the foregoing solution, if the tunnel IP address, of the IoT device, included in the packet body of the first IP packet is the address, of the IoT device, indicated by the tunnel identifier allocated by the central device, the central device identifies the IoT device based on the tunnel IP address, to prevent an unauthorized IoT device from sending the first IP packet to the central device. This can improve security.

In some possible implementations, that the IoT device generates a first IP packet includes: The IoT device generates a first IP packet of an application in the IoT device when the application initiates an IP request.

According to a second aspect, this application provides a packet transmission method, including: A central device receives a first internet protocol IP packet from an IoT device, where a destination address in a packet header of the first IP packet is an IP address of the central device, and a destination address in a packet body of the first IP packet is an IP address of a target device, the central device obtains the IP address, of the target device, in the packet body of the first IP packet; and the central device determines, according to a firewall rule of the IoT device, whether to send a third IP packet to the target device indicated by the IP address of the target device, where a destination address in a packet header of the third IP packet is the IP address of the target device, and a data part in a packet body of the third IP packet is a data part in the packet body of the first IP packet.

In the foregoing solution, the central device may determine, according to the firewall rule of the IoT device, whether to send the third IP packet to the target device, and the central device may be used as a firewall device, to avoid purchasing a dedicated firewall device for the IoT device. This can reduce costs and ensure security of the IoT device.

In some possible implementations, before a central device receives a first IP packet from an IoT device, the method further includes:

The central device sends a second IP packet to the IoT device, where a source address in a packet header of the second IP packet is the IP address of the central device.

In some possible implementations, before a central device receives a first IP packet from an IoT device, the method further includes: The central device sends a second IP packet to the IoT device, where a packet body of the second IP packet includes an IP configuration, and the IP configuration includes the IP address of the central device.

In some possible implementations, the IP configuration further includes a tunnel identifier used to establish a tunnel between the IoT device and the central device, and the method further includes:

The central device establishes the tunnel between the central device and the IoT device based on the tunnel identifier, where that a central device receives a first IP packet from an IoT device includes:

The central device receives the first IP packet from the IoT device through the tunnel.

In some possible implementations, the tunnel identifier is used to indicate a tunnel IP address of the IoT device and a tunnel IP address of the central device, and a source address in the packet body of the first IP packet is the tunnel IP address of the IoT device.

In some possible implementations, before the central device determines, according to a firewall rule of the IoT device, whether to send a third IP packet to the target device, the method further includes:

The central device determines whether the IoT device has permission to send the third IP packet to the target device.

That the central device determines, according to a firewall rule of the IoT device, whether to send a third IP packet to the target device includes:

If the central device determines that the IoT device has permission to send the third IP packet to the target device, the central device determines, according to the firewall rule of the IoT device, whether to send the third IP packet to the target device.

In some possible implementations, a source address in the packet header of the third IP packet is the IP address of the central device, or a source address in the packet header of the third IP packet is the IP address of the IoT device.

According to a third aspect, a packet transmission method is provided, including: An IoT device generates a first IP packet, where a destination address in a packet header of the first IP packet is an IP address of a central device, and a destination address in a packet body of the first IP packet is an IP address of a target device:

the IoT device sends the first IP packet to the central device based on the IP address of the central device;

the central device obtains the IP address, of the target device, in the packet body of the first IP packet; and the central device determines, according to a firewall rule of the IoT device, whether to send a third IP packet to the target device indicated by the IP address of the target device, where a destination address in a packet header of the third IP packet is the IP address of the target device, and a data part in the packet body of the third IP packet is a data part in the packet body of the first IP packet.

In some possible implementations, before an IoT device generates a first IP packet, the method further includes: The central device sends a second IP packet to the IoT device, where a source address in a packet header of the second IP packet is the IP address of the central device; and the IoT device obtains the IP address of the central device based on the packet header of the second IP packet.

In some possible implementations, before an IoT device generates a first IP packet, the method further includes: The central device sends a second IP packet to the IoT device, where a packet body of the second IP packet includes an IP configuration, and the IP configuration includes the IP address of the central device; and the IoT device obtains the IP address of the central device based on the IP configuration in the packet body of the second IP packet.

In some possible implementations, the IP configuration further includes a tunnel identifier used to establish a tunnel between the IoT device and the central device, and the method further includes: The IoT device and the central device establish the tunnel between the IoT device and the central device based on the tunnel identifier. That the IoT device sends the first IP packet to the central device based on the IP address of the central device includes: The IoT device sends the first IP packet to the central device based on the IP address of the central device through the tunnel.

In some possible implementations, the tunnel identifier is used to indicate a tunnel IP address of the IoT device and a tunnel IP address of the central device, and a source address in the packet body of the first IP packet is the tunnel JP address of the IoT device.

In some possible implementations, that an IoT device generates a first IP packet includes:

The IoT device generates a first IP packet of an application in the IoT device when the application initiates an IP request.

In some possible implementations, before the central device determines, according to a firewall rule of the IoT device, whether to send a third IP packet to the target device, the method further includes:

The central device determines whether the IoT device has permission to send the third IP packet to the target device.

That the central device determines, according to a firewall rule of the IoT device, whether to send a third IP packet to the target device includes:

If the central device determines that the IoT device has permission to send the third IP packet to the target device, the central device determines, according to the firewall rule of the IoT device, whether to send the third JP packet to the target device.

In some possible implementations, a source address in the packet header of the third IP packet is the IP address of the central device, or a source address in the packet header of the third IP packet is the IP address of the IoT device.

According to a fourth aspect, an apparatus is provided. The apparatus is included in an electronic device, and the apparatus has a function of implementing behavior of the electronic device in the foregoing aspects and the possible implementations of the foregoing aspects. The function may be implemented by using hardware, or may be implemented by using hardware executing corresponding software. The hardware or the software includes one or more modules or units corresponding to the foregoing function, for example, a transceiver module or unit, a processing module or unit, or an obtaining module or unit.

Optionally, the apparatus may be the IoT device or the central device described above.

According to a fifth aspect, an apparatus is provided. The apparatus includes a processor, the processor is coupled to a memory, the memory is configured to store a computer program or instructions, and the processor is configured to execute the computer program or the instructions stored in the memory, so that the methods in the foregoing aspects and the possible implementations of the foregoing aspects are performed.

For example, the processor is configured to execute the computer program or the instructions stored in the memory, so that the apparatus performs the methods in the foregoing aspects and the possible implementations of the foregoing aspects.

Optionally, the apparatus includes one or more processors.

Optionally, the apparatus may further include the memory coupled to the processor.

Optionally, the apparatus may include one or more memories.

Optionally, the memory may be integrated with the processor, or disposed separately.

Optionally, the apparatus may further include a transceiver.

According to a sixth aspect, this application provides an electronic device, including one or more processors, a memory, a plurality of applications, and one or more computer programs. The one or more computer programs are stored in the memory and the one or more computer programs include instructions. When the instructions are executed by the electronic device, the electronic device is enabled to perform the packet transmission method in any possible implementation of any one of the foregoing aspects.

Optionally, the electronic device may further include a touchscreen and/or a camera, where the touchscreen includes a touch-sensitive surface and a display.

Optionally, the electronic device may be the IoT device or the central device described above.

According to a seventh aspect, this application provides a computer-readable storage medium, including computer instructions. When the computer instructions are run on an electronic device, the electronic device is enabled to perform the packet transmission method in any possible implementation of any one of the foregoing aspects.

According to an eighth aspect, this application provides a computer program product. When the computer program product runs on an electronic device, the electronic device is enabled to perform the packet transmission method in any possible implementation of any one of the foregoing aspects.

DESCRIPTION OF EMBODIMENTS

The following describes technical solutions in embodiments of this application with reference to the accompanying drawings in embodiments of this application.

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly indicate or implicitly include one or more such features.

Figure 1:
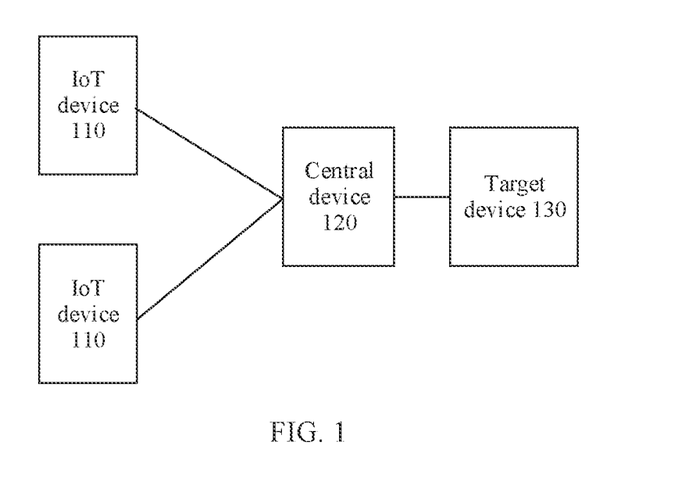
FIG. 1 is a schematic diagram of an application scenario according to an embodiment of this application.

As an internet of things develops, and IoT devices increase, costs of the IoT devices are low, and most IoT devices do not have a firewall capability. To prevent an IoT device from being attacked, a dedicated firewall device needs to be installed. For example, a router may be used as a firewall device to prevent the IoT device from being attacked. However, the router is expensive and costs a lot. In the internet of things, many IoT devices do not have the firewall capability, and some IoT devices have the firewall capability. In embodiments of this application, some devices having the firewall capability may be used as central devices of the IoT device to protect the IoT device, to securely send an IP packet of the IoT device to a target device. As shown in FIG. 1, two IoT devices are used as an example. The two IoT devices 110 send, to a central device 120, IP packets to be sent to a target device 130. The central device 120 has a firewall capability, and the central device 120 determines, according to a firewall rule of the central device 120, whether to forward the IP packet from the IoT device 110 to the target device 130. The central device 120 may be used as a hub to aggregate traffic of the IoT device. For example, a home internet of things may include IoT devices such as an electricity meter, a water meter, a wristband, and a watch. If no firewall device is provided for these IoT devices, data of these IoT devices may be attacked. The home internet of things includes some devices having firewall capabilities, such as a television or a sound box. In this case, the television or the sound box may be used as the central device of these IoT devices, and sends IP packets from these IoT devices to servers of these IoT devices, a cloud, or a third-party device.

Figure 2:
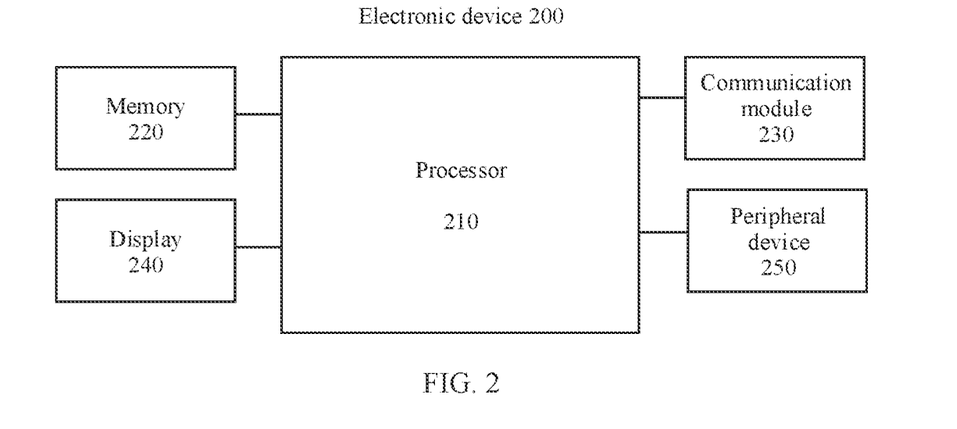
FIG. 2 is a schematic block diagram of a packet transmission apparatus according to an embodiment of this application.

For example, FIG. 2 is a schematic diagram of a structure of an electronic device 200 according to an embodiment of this application. The electronic device may be an IoT device, a central device, or a target device. The electronic device 200 may include a processor 210, a memory 220, a communication module 230, a display 240, and the like.

The processor 210 may include one or more processing units, and the memory 220 is configured to store program code and data. In this embodiment of this application, the processor 210 may execute the computer executable instructions stored in the memory 220, to control and manage an action of the electronic device 200.

The communication module 230 may be used for communication between internal modules of the electronic device 200, communication between the electronic device 200 and another external electronic device, or the like. For example, if the electronic device 200 communicates with another electronic device in a wired connection manner, the communication module 230 may include an interface, for example, a USB port. The USB port may be a port that complies with a USB standard specification, and may be specifically a Mini USB port, a Micro USB port, a USB Type-C port, or the like. The USB port may be configured to connect to a charger to charge the electronic device 200, or may be configured to transmit data between the electronic device 200 and a peripheral device, or may be configured to connect to a headset, to play audio by using the headset. The port may be further configured to connect to another electronic device such as an AR device.

Alternatively, the communication module 230 may include an audio component, a radio frequency circuit, a Bluetooth chip, a wireless fidelity (wireless fidelity, Wi-Fi) chip, a near-field communication (near-field communication, NFC) module, and the like, and may implement interaction between the electronic device 200 and another electronic device in a plurality of different manners.

The display 240 is configured to display an image, a video, or the like. Optionally, the electronic device 200 may further include a peripheral device 250, for example, a mouse, a keyboard, a speaker, or a microphone.

It should be understood that, except for the various components or modules listed in FIG. 2, a structure of the electronic device 200 is not specifically limited in this embodiment of this application. In some other embodiments of this application, the electronic device 200 may further include more or fewer components than those shown in the figure, combine some components, split some components, or have different component arrangements. The components shown in the figure may be implemented by using hardware, software, or a combination of software and hardware.

Figure 3:
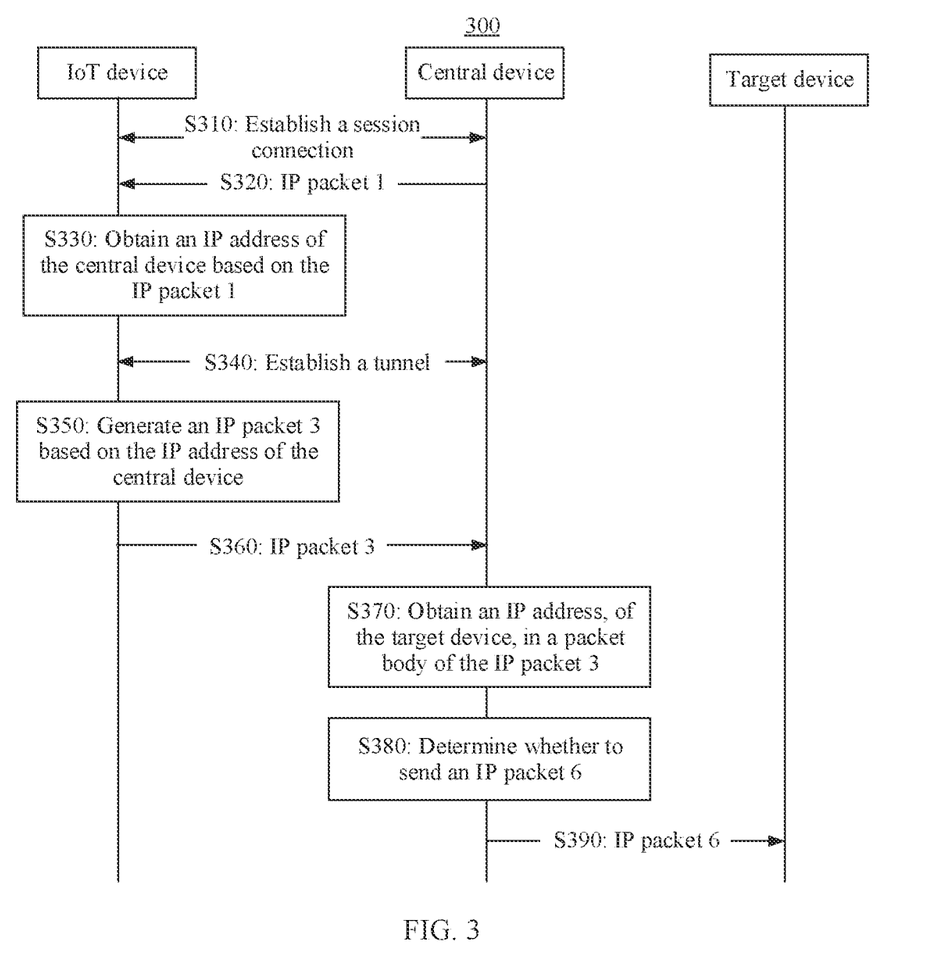
FIG. 3 is a schematic diagram of a packet transmission method according to an embodiment of this application.

With reference to FIG. 3, the following describes a packet transmission method 300 according to an embodiment of this application. The method 300 is performed by a central device and an IoT device.

S310: The central device may establish a session connection to the IoT device.

Specifically, in S310, the central device and the IoT device may negotiate a key for transmitting an IP packet. Subsequent session content between the central device and the IoT device needs to be encrypted and authenticated by using the negotiated key. In this way, security of the session content between the central device and the IoT device can be ensured.

Optionally, in a process of establishing the session connection between the central device and the IoT device, the IoT device may learn an IP address of the central device, and the central device may also learn an IP address of the IoT device. If the IoT device can learn the IP address of the central device, the following processes of sending an IP packet 1 and obtaining the IP address of the central device in S320 and S330 may be omitted.

S320: The central device sends the IP packet 1 to the IoT device, and the IoT device receives the IP packet 1 of the central device. For example, the IP packet 1 may be the foregoing second IP packet.

For example, the IP packet 1 sent by the central device to the IoT device may be encrypted by using an encryption key negotiated in S310.

S330: The IoT device obtains the IP address of the central device based on the IP packet 1.

For example, the IoT device may decrypt the IP packet 1 based on a decryption key negotiated in S310, to obtain the IP address of the central device.

Specifically, in S330, obtaining the IP address of the central device by the IoT device is discussed in the following two cases:

In case 1, a source address in a packet header of the IP packet 1 is the IP address of the central device, and the IoT device obtains the IP address of the central device based on the packet header of the IP packet 1.

In case 2, a packet body of the IP packet 1 includes an IP configuration, and the IP configuration includes the IP address of the central device. The IoT device determines the IP address of the central device based on the IP configuration included in the packet body of the IP packet 1.

Optionally, in case 2, in addition to the IP address of the central device, the IP configuration may further include a tunnel identifier. The tunnel identifier is used to establish a tunnel between the central device and the IoT device, and the tunnel identifier is used to indicate a tunnel IP address of the IoT device and a tunnel IP address of the central device.

It may be understood that, for ease of description, the packet body of the IP packet 1 includes the IP configuration, and the IP configuration may include the IP address of the central device and the tunnel identifier. In actual application, the IP address of the central device and the tunnel identifier may be carried in packet bodies of different IP packets. For example, the packet body of the IP packet 1 includes an IP configuration 1, the IP configuration 1 includes the IP address of the central device, a packet body of an IP packet 2 includes an IP configuration 2, and the IP configuration 2 includes the tunnel identifier, where the IP packet 1 and the IP packet 2 are different IP packets. This is not limited in this application.

Optionally, the IP configuration may not include the IP address of the central device and may include only the tunnel identifier.

S340: If the IP configuration includes the tunnel identifier, the IoT device establishes a tunnel between the IoT device and the central device based on the tunnel IP address of the IoT device and the tunnel IP address of the central device that are indicated by the tunnel identifier.

The tunnel may be understood as a channel for transmitting an IP packet between the IoT device and the central device. The tunnel established in S340 may also be a tunnel that supports encryption and authentication and that has a security capability. In this way, security of the IP packet transmitted through the tunnel can be ensured.

S350: When an application of the IoT device initiates an IP request, the IoT device generates an IP packet 3 based on the IP address of the central device. For example, the IP packet 3 may be the foregoing first IP packet, a destination address (destination address, DA) in a packet header of the IP packet 3 is the IP address of the central device, and a DA in a packet body of the IP packet 3 is an IP address of a target device.

Figure 4:
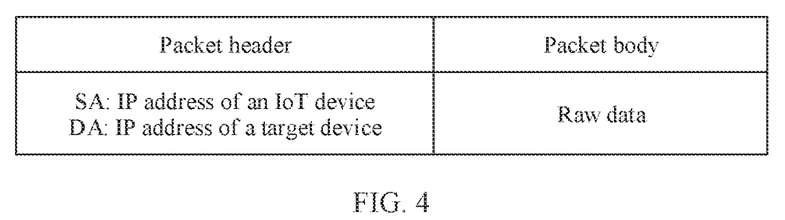
FIG. 4 is a schematic diagram of a format of an IP packet according to an embodiment of this application.
Figure 5:
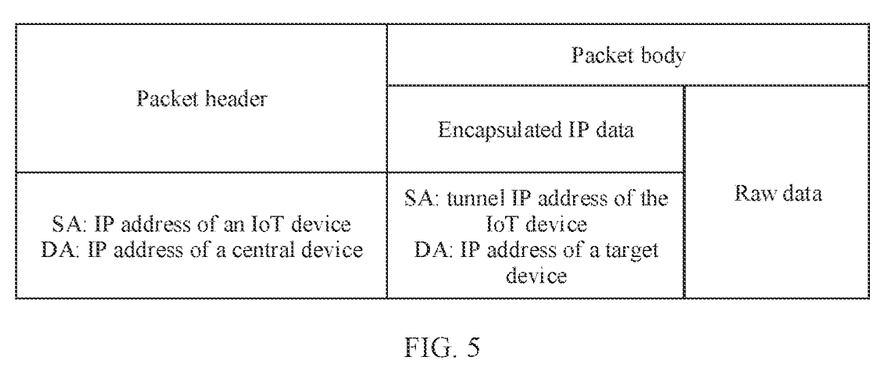
FIG. 5 is a schematic diagram of a format of an IP packet 3 according to an embodiment of this application.

In the conventional technology, a DA in a packet header of an IP packet sent by the IoT device is an IP address of a target device. FIG. 4 shows a format of the IP packet sent by the IoT device in the conventional technology. As shown in FIG. 4, a source address (source address, SA) is the IP address of the IoT device, and a DA is the IP address of the target device. However, in this embodiment of this application, the IoT device encapsulates the IP address of the target device into the IP packet body based on the IP configuration, and uses the IP address of the central device as the destination address in the packet header of the IP packet, to generate the IP packet 3. A format of the IP packet 3 is shown in FIG. 5. An SA in the packet header of the IP packet 3 is the IP address of the IoT device, and a DA in the packet header of the IP packet 3 is the IP address of the central device. The IP address of the target device is encapsulated into the packet body as encapsulated IP data. If the IP configuration includes the tunnel identifier, as shown in FIG. 5, an SA in the packet body of the IP packet 3 is the tunnel IP address of the IoT device indicated by the tunnel identifier. If the IP configuration does not include the tunnel identifier, the SA in the packet body of the IP packet 3 may be empty, and no address information is available.

If the IP configuration includes the tunnel identifier, as shown in FIG. 5, the SA in the packet body of the IP packet 3 is the tunnel IP address of the IoT device indicated by the tunnel identifier. After S350 is performed, the central device may determine that the IP packet 3 is sent by the IoT device corresponding to the tunnel IP address of the IoT device. In addition, if the central device sends tunnel identifiers to a plurality of IoT devices, the tunnel identifiers of the IoT devices are different. For example, a tunnel identifier 1 indicates a tunnel IP address 1 of an IoT device 1 and the tunnel IP address of the central device, and a tunnel identifier 2 indicates a tunnel IP address 2 of an IoT device 2 and the tunnel IP address of the central device. The IoT device 1 sends an IP packet 4 to the central device, and the IoT device 2 sends an IP packet 5 to the central device. An SA in a packet body of the IP packet 4 is the tunnel IP address 1, and an SA in a packet body of the IP packet 5 is the tunnel IP address 2. In this way, the central device may identify, by identifying the source addresses in the packet bodies of the IP packet 4 and the IP packet 5, that the IP packet 4 is from the IoT device 1, and that the IP packet 5 is from the IoT device 2.

For example, the IP packet 3 sent by the central device to the IoT device may be encrypted by using the encryption key negotiated in S310. It should be noted that there is no limitation on an order of S340 and S350, and S340 may be performed before, after, or at the same time of S350.

S360: The IoT device sends the IP packet 3 to the central device based on the IP address of the central device, and the central device receives the IP packet 3 from the IoT device.

Optionally, if the IP configuration includes the tunnel identifier, in this case, the tunnel is established between the IoT device and the central device, and S360 includes: The IoT device sends the IP packet 3 to the central device through the established tunnel based on the IP address of the central device, and the central device receives the IP packet 3 from the IoT device through the established tunnel. In this way, the IoT device and the central device transmit the IP packet 3 through the tunnel, improving security.

It may be understood that, if the IP configuration of the IP packet 1 does not include the tunnel identifier, no tunnel may be established between the IoT device and the central device, and the IoT device may directly send the IP packet 3 to the central device based on the IP address of the central device.

For example, the IoT device may decrypt the IP packet 3 based on the decryption key negotiated in S310.

S370: The central device obtains the IP address, of the target device, in the packet body of the IP packet 3.

Specifically, in S370, the central device parses the IP packet 3, obtains the IP address, of the target device, in the packet body of the IP packet 3, and uses the IP address of the target device as a destination address in a packet header of an IP packet 6. For example, the IP packet 1 may be the foregoing third IP packet.

S380: The central device determines, according to a firewall rule of the IoT device, whether to send the IP packet 6 to the target device.

Specifically, the central device may set firewall rules of a plurality of IoT devices, and the central device may determine, according to the firewall rule of the IoT device in the method 300, whether to send the IP packet 6 to the target device. For example, the firewall rule, of the IoT device, stored by the central device may include at least one of the IP address, a port, and a protocol type of the target device. For example, the central device determines whether the IP address, of the target device, obtained in S370 is an IP address of a target device that is allowed to be sent by the IoT device in the firewall rule, and if yes, the central device sends the IP packet 6 to the target device. For another example, the central device determines the protocol type of the IP address, of the target device, obtained in S370, and if the protocol type of the IP address, of the target device, obtained in S370 is an allowed protocol type in the firewall rule, the central device sends the IP packet 6 to the target device. For still another example, the central device determines a port corresponding to the IP address, of the target device, obtained in S370, and if the port corresponding to the IP address, of the target device, obtained in S370 is an allowed port in the firewall rule, the central device sends the IP packet 6 to the target device.

A data part of the IP packet 3 and a data part of the IP packet 6 are the same, except that the IP packet 3 and the IP packet 6 have different packet headers, the destination address in the packet header of the IP packet 3 is the IP address of the central device, and the destination address in the packet header of the IP packet 6 is an IP address of a destination device.

In S380, if the central device determines, according to the firewall rule of the central device, that the IoT device can send the IP packet to the target device, the central device performs S390, or if the central device determines, according to the firewall rule of the central device, that the target device is invalid, the central device stops sending the IP packet 6.

S380 is discussed below in two cases:

In case 1, before S380, the central device determines whether the IoT device has permission to send the IP packet 6 to the target device. If the central device determines that the IoT device has permission to send the IP packet 6 to the target device, S380 is performed. If the central device determines that the IoT device has no permission to send the IP packet 6 to the target device, S380 is not performed.

In case 2, after the central device performs S380, if the central device determines, according to the firewall rule of the central device, to send the IP packet 6 to the target device, the central device determines whether the IoT device has permission to send the IP packet 6 to the target device. If the central device has permission to send the IP packet 6 to the target device, the central device sends the IP packet 6 to the target device. If the central device has no permission to send the IP packet 6 to the target device, the central device does not send the IP packet 6 to the target device. After the central device performs S380, if the central device determines, according to the firewall rule of the central device, not to send the IP packet 6 to the target device, the central device also does not need to determine whether the IoT device has permission to send the IP packet 6 to the target device.

S390: The central device sends the IP packet 6 to the target device, and the target device receives the IP packet 6 from the central device.

Figure 6:
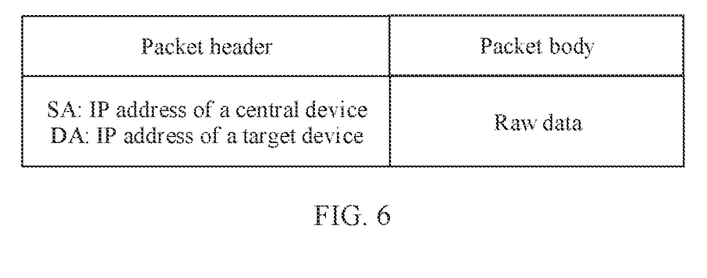
FIG. 6 is a schematic diagram of a format of an IP packet 6 according to an embodiment of this application.

In S390, the IP packet 6 is discussed below in two cases:

In case 1, a format of the IP packet 6 is shown in FIG. 6. A DA in the packet header of the IP packet 6 is the IP address of the target device, and an SA in the packet header of the IP packet 6 is the IP address of the central device. For the target device, it can be learned that the received IP packet 6 is from the central device. Especially, when the target device and the central device are encrypted for transmission through the tunnel, the target device may decrypt the IP packet 6 by using the key between the target device and the central device, to parse the IP packet 6 from the central device.

In case 2, a format of the IP packet 6 may be alternatively shown in FIG. 4. A DA in the packet header of the IP packet 6 is the IP address of the target device, and an SA in the packet header of the IP packet 6 is the IP address of the IoT device. For the target device, it can be learned that the received IP packet 6 is from the IoT device rather than the central device.

It may be understood that, in S320, the central device may send the IP packet 1 to the IoT device once, and perform S350 to S390 for a plurality of times. Similarly, in S330, the IoT device may obtain the IP address of the central device once, and in S340, the IoT device may establish the tunnel once, and perform S350 to S390 for a plurality of times. In other words, the IoT device may receive the IP packet 1 of the central device once, and establish the tunnel based on the IP configuration in the IP packet 1 once, and the IoT device may generate a plurality of IP packets based on the obtained IP address of the central device to send data.

In the method 300, the IoT device transmits the IP packet 3 (or the IP packet 6) to the target device by using the central device. Similarly, when the target device receives the IP packet 6, from the IoT device, forwarded by the central device, the target device does not directly send a response of the IP packet 6 to the IoT device, and the target device may alternatively send the response of the IP packet 6 to the IoT device by using the central device. With reference to a method 700 in FIG. 7, the following describes a case in which a target device may send a response of the IP packet 6 to an IoT device by using a central device.

Figure 7:
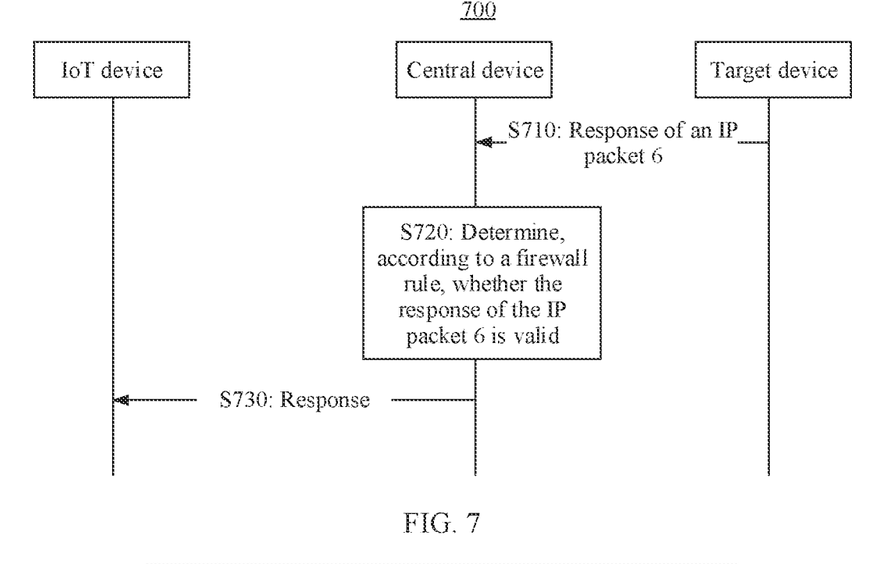
FIG. 7 is a schematic diagram of a response for transmitting an IP packet according to an embodiment of this application.

S710: After the target device receives the IP packet 6, if a source address in a packet header of the IP packet 6 is the central device, the target device may send the response of the IP packet 6 to the central device, and the central device receives the response of the IP packet 6, where the response of the IP packet 6 may be an IP packet.

In an alternative manner of S710, after the target device receives the IP packet 6, if the source address in the packet header of the IP packet 6 is an IP address of the IoT device, the target device may send the response of the IP packet 6 to the IoT device. In this case, steps of the method 700 are not performed.

S720: After receiving the response of the IP packet 6, the central device determines, according to a firewall rule of the central device, whether the response of the IP packet 6 is valid. If the response is valid, that is, the response of the IP packet 6 is a response of an IP packet 3. S730 is performed. If the response is invalid, the central device discards the response of the IP packet 6.

S730: The central device sends the response of the IP packet 3 to the IoT device through the tunnel established in S330, and the IoT device receives the response of the IP packet 3.

It should be noted that the tunnel established in S340 may be a bidirectional tunnel. The IoT device may send the IP packet 3 to the central device through the bidirectional tunnel. The IoT device may also receive the response, of the IP packet 3, from the central device, and the response of the IP packet 3 may be alternatively an IP packet. Specifically, the IoT device determines, based on a source address of a response IP packet, whether the response IP packet is from the central device. If the source address of the response IP packet is the IP address of the central device, the response IP packet is retained, or if the source address of the response IP packet is not the source address of the central device, the response IP packet is discarded. This can ensure that the IoT device does not receive a packet from a non-central device, improving security.

Figure 8:
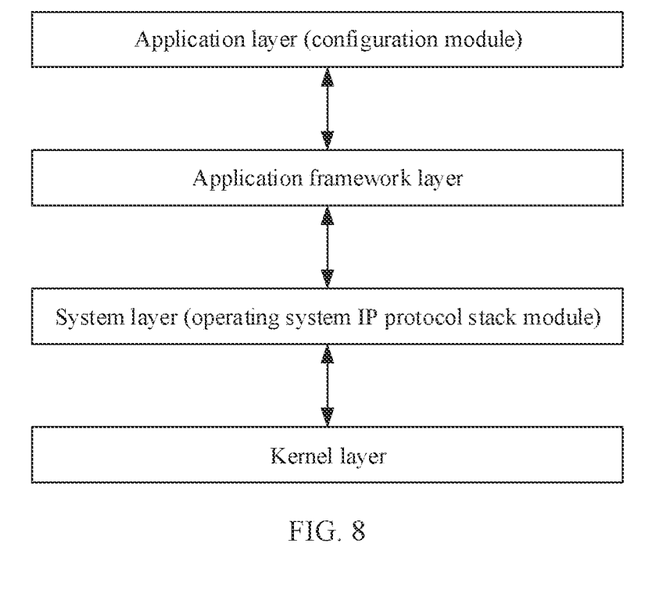
FIG. 8 is a schematic diagram of a software architecture of an IoT device according to an embodiment of this application.
Figure 9:
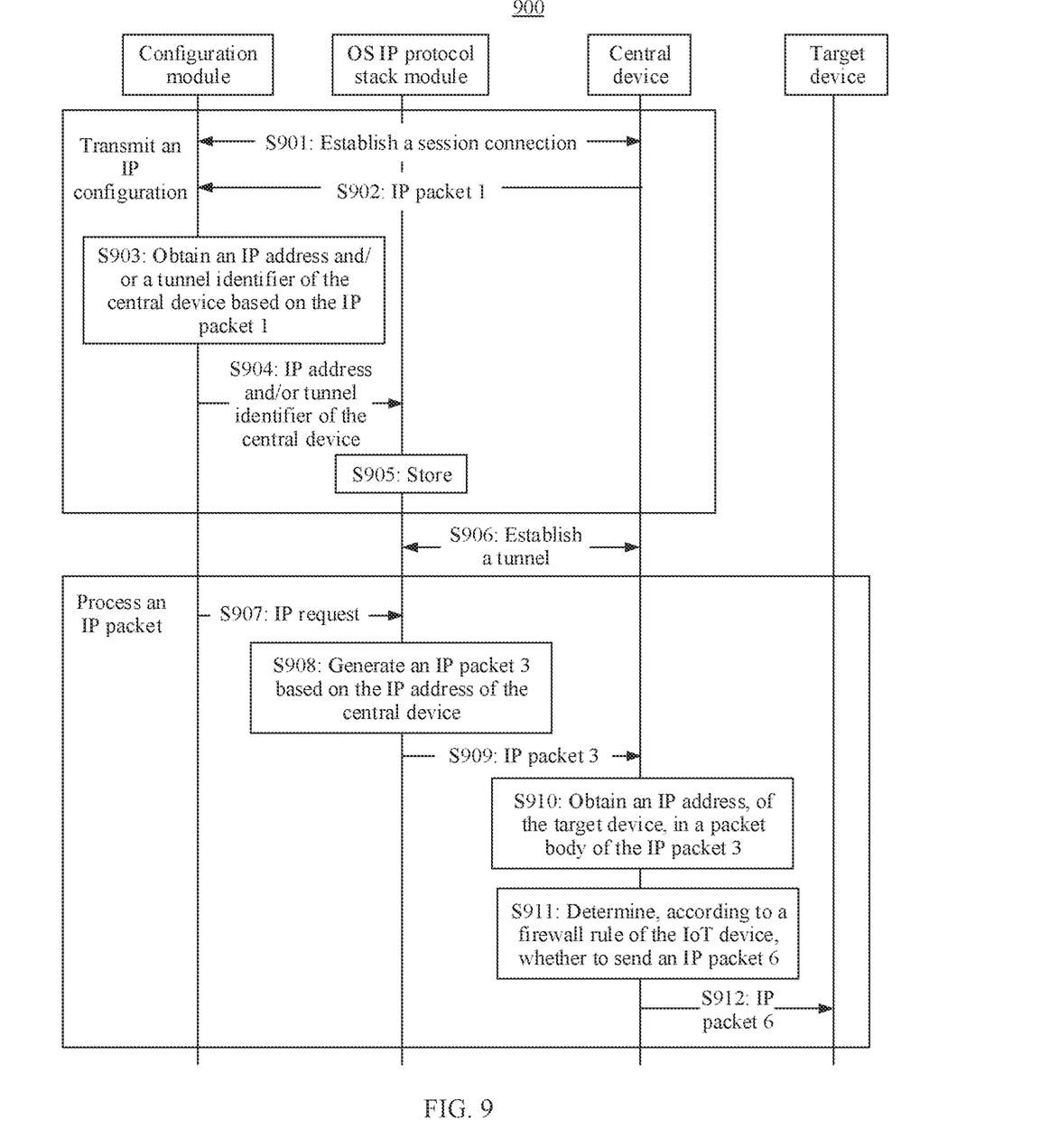
FIG. 9 is a schematic diagram of another packet transmission method according to an embodiment of this application.

FIG. 8 is a block diagram of a software structure of an IoT device according to an embodiment of this application. In a layered architecture, software is divided into several layers, and each layer has a clear role and task. The layers communicate with each other through a software interface. In some embodiments, the software structure of the IoT device may include an application layer, an application framework layer, a system layer, and a kernel layer from top to bottom. The application layer is configured to store an application. The application framework layer provides an application programming interface (application programming interface, API) and a programming framework for an application at the application layer. The application framework layer includes some predefined functions. The system layer may include a plurality of functional modules of an operating system. The kernel layer is a layer between hardware and software. The kernel layer includes at least a display driver, a camera driver, an audio driver, and a sensor driver. A configuration module at the application layer of the IoT device and an operating system (operating system, OS) IP protocol stack module at the system layer may assist in completing the packet transmission method provided in embodiments of this application. A processor 210 of the IoT device corresponds to the configuration module and the OS IP protocol stack module. For details, refer to the description of the method 900 in FIG. 9. FIG. 9 mainly includes two processes: transmitting an IP configuration and processing an IP packet. A plurality of IP packets may be transmitted for one transmission of the IP configuration.

S901: A central device establishes a session connection to a configuration module of an IoT device.

It may be understood that, in a process of establishing the session connection between the central device and the configuration module of the IoT device, a key for transmitting the IP packet between the central device and the IoT device is negotiated.

Optionally, in a process of establishing the session connection between the central device and the configuration module of the IoT device, the configuration module of the IoT device may learn an IP address of the central device, and the central device may also learn an IP address of the IoT device. If the configuration module of the IoT device can learn the IP address of the central device, the following processes of sending an IP packet 1 and obtaining the IP address of the central device in S902 and S903 may be omitted.

S902: The central device sends the IP packet 1 to the configuration module.

S903: The configuration module obtains the IP address of the central device based on the IP packet 1.

Specifically, two cases of S903 and S330 are the same, except that the IoT device obtains the IP address of the central device in S330, and the configuration module obtains the IP address of the central device in S903. Specifically, two cases are described as follows:

In case 1, a source address in a packet header of the IP packet 1 is the IP address of the central device, and the configuration module obtains the IP address of the central device based on the packet header of the IP packet 1. S904 is performed. In S904, the configuration module sends the IP address of the central device to an OS IP protocol stack module.

In case 2, a packet body of the IP packet 1 includes an IP configuration, and the IP configuration includes the IP address of the central device. The configuration module determines the IP address of the central device based on the IP configuration included in the packet body of the IP packet 1. S904 is performed. In S904, the configuration module sends the IP address of the central device to an OS IP protocol stack module.

Optionally, in case 2, in addition to the IP address of the central device, the IP configuration may further include a tunnel identifier. If the IP configuration includes the IP address of the central device and the tunnel identifier, S904 is performed. In S904, the IP address of the central device and the tunnel identifier are sent to the OS IP protocol stack module.

S904: The configuration module sends the IP address of the central device to the OS IP protocol stack module, or sends the IP address of the central device and the tunnel identifier.

S905: The OS IP protocol stack module stores the IP address of the central device, or stores the IP address of the central device and the tunnel identifier.

S906: If the OS IP protocol stack module stores the tunnel identifier, the OS IP protocol stack module establishes the tunnel based on the tunnel identifier.

It should be noted that S906 may be performed before S908, but there is no limitation on an order of S906, S907, and S908. S906 may be performed before S907 or S908, or S906 may be performed after S907 or S908, or S906 is performed simultaneously with S907 or S908.

S907: When an application is started, the configuration module may send an IP request to the OS IP protocol stack module.

S908: The OS IP protocol stack module generates an IP packet 3 based on the IP address of the central device.

Specifically, for a manner in which the OS IP protocol stack module generates the IP packet 3, refer to the description of S350.

S909: The OS IP protocol stack module forwards the IP packet 3 to the central device through the tunnel established in S906.

S910 to S912 are the same as S370 to S390.

The following describes a typical application scenario applied to the packet transmission method provided in embodiments of this application.

A user purchases a smart refrigerator of a vendor A, and has a smart television of the vendor A at home. The smart refrigerator does not have a firewall function, and the smart television has a firewall function. However, a router at home is from a vendor B. and the router of the vendor B at home is not configured with a firewall rule of the smart refrigerator of the vendor A. In the conventional technology, to prevent the smart refrigerator of the vendor A from being attacked, a dedicated router configured with the firewall rule of the smart refrigerator of the vendor A needs to be purchased, but costs of purchasing the router are high. According to the packet transmission method provided in embodiments of this application, after the smart refrigerator of the vendor A is started, the smart refrigerator of the vendor A can be found by the smart television of the vendor A, and then a secure session is established between the smart refrigerator of the vendor A and the smart television of the vendor A. In addition, the smart television of the vendor A may be preconfigured with the firewall rule of the smart refrigerator of the vendor A. The smart refrigerator of the vendor A generates an IP packet 3 according to the foregoing method embodiments, where a destination address in a packet header of the IP packet 3 is the smart television of the vendor A. and an IP address of a real target device of the IP packet 3 exists in a packet body of the IP packet 3. In this way, the smart refrigerator of the vendor A may first route the IP packet 3 to the smart television of the vendor A, and the smart television of the vendor A parses the IP packet 3 to obtain the IP address, of the target device, in the packet body of the IP packet 3. The smart television of the vendor A determines, according to the firewall rule of the smart refrigerator, whether the target device is valid. If the target device is valid, the smart television of the vendor A sends an IP packet 6 to the target device, where a data part of the IP packet 6 is a data part of the IP packet 3, and a destination address in a packet header of the IP packet 6 is the IP address of the target device. In this way, the smart television of the vendor A may route the IP packet 3 from the smart refrigerator of the vendor A to the target device, to avoid purchasing a dedicated routing device for the smart refrigerator of the vendor A. This can reduce costs.

It may be understood that, in addition to the foregoing home internet of things scenario, the packet transmission method provided in embodiments of this application may be alternatively applied to scenarios such as a smart grid, smart agriculture, intelligent transportation, and environment detection. To avoid repeated description, details are not described in this embodiment of this application.

In addition to dividing the IoT device into the configuration module and the OS IP module in FIG. 9, in this embodiment, the IoT device and the central device may be divided into functional modules according to the foregoing method examples. For example, each functional module may be obtained through division corresponding to each function, or two or more functions may be integrated into one processing module. The integrated module may be implemented in a form of hardware. It should be noted that, in embodiments, division into the modules is an example and is merely logical function division, and may be other division in an actual implementation.

It should be noted that, all related content of steps in the foregoing method embodiments may be cited in function descriptions of corresponding functional modules. Details are not described herein again.

The IoT device and the central device provided in this embodiment are configured to perform the foregoing packet transmission method, and therefore, an effect the same as that of the foregoing implementation method can be achieved. When an integrated unit is used, the IoT device and the central device each may include a processing module, a storage module, and a communication module. The processing module may be configured to control and manage actions of the IoT device and the central device, for example, may be configured to support an electronic device in performing steps performed by the processing unit. The storage module may be configured to support the IoT device and the central device in executing stored program code, data, and the like. The communication module may be configured to support the IoT device and the central device in communicating with another device.

The processing module may be a processor or a controller. The processing module may implement or execute logical blocks, modules, and circuits in various examples described with reference to content disclosed in this application. The processor may be alternatively a combination that implements a computing function, for example, a combination that includes one or more microprocessors, a combination of a digital signal processor (digital signal processor, DSP) and a microprocessor, and the like. The storage module may be a memory. The communication module may be specifically a device such as a radio frequency circuit, a Bluetooth chip, or a Wi-Fi chip that interacts with another electronic device.

In an embodiment, when the processing module is a processor, and the storage module is a memory, the electronic device in this embodiment may be a device having a structure shown in FIG. 2.

This embodiment further provides a computer-readable storage medium. The computer-readable storage medium stores computer instructions. When the computer instructions are run on an electronic device, the electronic device is enabled to perform the foregoing related method steps to implement the secure data access method in the foregoing embodiments.

This embodiment further provides a computer program product. When the computer program product runs on a computer, the computer is enabled to perform the foregoing related steps to implement the secure data access method in the foregoing embodiments.

In addition, an embodiment of this application further provides an apparatus. The apparatus may be specifically a chip, a component, or a module, and the apparatus may include a processor and a memory that are connected to each other. The memory is configured to store computer executable instructions. When the apparatus runs, the processor may execute the computer executable instructions stored in the memory, so that the chip performs the secure data access method in the foregoing method embodiments.

The electronic device, the computer storage medium, the computer program product, or the chip provided in this embodiment are all configured to perform the corresponding method provided above. Therefore, for beneficial effects that can be achieved by the electronic device, the computer storage medium, the computer program product, or the chip, refer to beneficial effects in the corresponding method provided above. Details are not described herein again.

Based on the foregoing descriptions of the implementations, a person skilled in the art may understand that, for the purpose of convenient and brief description, division into the foregoing functional modules is used as an example for illustration. In actual application, the foregoing functions can be allocated to different functional modules and implemented based on a requirement, that is, an inner structure of an apparatus is divided into different functional modules to implement all or some of the functions described above.

In the several embodiments provided in this application, it should be understood that the disclosed apparatuses and methods may be implemented in other manners. For example, the described apparatus embodiment is merely an example. For example, division into the modules or the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, and may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of steps of methods in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for packet transmission, comprising:
generating, by an internet of things (IoT) device, a first internet protocol (IP) packet, wherein a destination address in a packet header of the first IP packet is an IP address of a central device, and a destination address in a packet body of the first IP packet is an IP address of a target device; and
sending, by the IoT device, the first IP packet to the central device based on the IP address of the central device to cause the central device to send a third IP packet to the target device according to a firewall rule of the IoT device, wherein a destination address in a packet header of the third IP packet is the IP address of the target device, a data part in a packet body of the third IP packet is the data part in the packet body of the first IP packet, the IoT device does not have a firewall capability, the central device has the firewall capability, and the central device is configured with the firewall rule of the IoT device.

2. The method according to claim 1, wherein before the generating, by an IoT device, a first IP packet, the method further comprises:
receiving, by the IoT device, a second IP packet from the central device, wherein a source address in a packet header of the second IP packet is the IP address of the central device; and
obtaining, by the IoT device, the IP address of the central device based on the packet header of the second IP packet.

3. The method according to claim 1, wherein before the generating, by an IoT device, a first IP packet, the method further comprises:
- receiving, by the IoT device, a second IP packet from the central device, wherein a packet body of the second IP packet comprises an IP configuration, and the IP configuration comprises the IP address of the central device; and
- obtaining, by the IoT device, the IP address of the central device based on the IP configuration in the packet body of the second IP packet.

4. The method according to claim 3, wherein the IP configuration further comprises a tunnel identifier used to establish a tunnel between the IoT device and the central device, and the method further comprises:
- establishing, by the IoT device, the tunnel between the IoT device and the central device based on the tunnel identifier; and
- the sending, by the IoT device, the first IP packet to the central device based on the IP address of the central device comprises:
  - sending, by the IoT device, the first IP packet to the central device based on the IP address of the central device through the tunnel.

5. The method according to claim 4, wherein the tunnel identifier is used to indicate a tunnel IP address of the IoT device and a tunnel IP address of the central device, and a source address in the packet body of the first IP packet is the tunnel IP address of the IoT device.

6. The method according to claim 1, wherein the generating, by an IoT device, a first IP packet comprises:
- generating, by the IoT device, the first IP packet of an application in the IoT device in response to determining that the application initiates an IP request.

7. A method for packet transmission, comprising:
- receiving, by a central device, a first internet protocol (IP) packet from an internet of things (IoT) device, wherein a destination address in a packet header of the first IP packet is an IP address of the central device, and a destination address in a packet body of the first IP packet is an IP address of a target device;
- obtaining, by the central device, the IP address, of the target device, in the packet body of the first IP packet; and
- determining, by the central device according to a firewall rule of the IoT device, whether to send a third IP packet to the target device indicated by the IP address of the target device, wherein a destination address in a packet header of the third IP packet is the IP address of the target device, and a data part in a packet body of the third IP packet is a data part in the packet body of the first IP packet, wherein the IoT device does not have a firewall capability, the central device has the firewall capability, and the central device is configured with the firewall rule of the IoT device.

8. The method according to claim 7, wherein before the receiving, by a central device, a first IP packet from an IoT device, the method further comprises:
- sending, by the central device, a second IP packet to the IoT device, wherein a source address in a packet header of the second IP packet is the IP address of the central device.

9. The method according to claim 7, wherein before the receiving, by a central device, a first IP packet from an IoT device, the method further comprises:
- sending, by the central device, a second IP packet to the IoT device, wherein a packet body of the second IP packet comprises an IP configuration, and the IP configuration comprises the IP address of the central device.

10. The method according to claim 9, wherein the IP configuration further comprises a tunnel identifier used to establish a tunnel between the IoT device and the central device, and the method further comprises:
- establishing, by the central device, the tunnel between the central device and the IoT device based on the tunnel identifier; and
- the receiving, by a central device, a first IP packet from an IoT device comprises:
  - receiving, by the central device, the first IP packet from the IoT device through the tunnel.

11. The method according to claim 10, wherein the tunnel identifier is used to indicate a tunnel IP address of the IoT device and a tunnel IP address of the central device, and a source address in the packet body of the first IP packet is the tunnel IP address of the IoT device.

12. The method according to claim 7, wherein before the determining, by the central device according to a firewall rule of the IoT device, whether to send a third IP packet to the target device, the method further comprises:
- determining, by the central device, whether the IoT device has permission to send the third IP packet to the target device; and
- the determining, by the central device according to a firewall rule of the IoT device, whether to send a third IP packet to the target device comprises:
  - in response to determining that the IoT device has permission to send the third IP packet to the target device, determining, by the central device according to the firewall rule of the IoT device, whether to send the third IP packet to the target device.

13. The method according to claim 7, wherein a source address in the packet header of the third IP packet is the IP address of the central device, or a source address in the packet header of the third IP packet is the IP address of the IoT device.

14. An internet of things (IoT) device, comprising at least one processor; and
- one or more memories coupled to the at least one processor and storing programming instructions for execution by the at least one processor to cause the IoT device to:
  - generate a first internet protocol (IP) packet, wherein a destination address in a packet header of the first IP packet is an IP address of a central device, and a destination address in a packet body of the first IP packet is an IP address of a target device; and
  - send the first IP packet to the central device based on the IP address of the central device to cause the central device to send a third IP packet to the target device according to a firewall rule of the IoT device, wherein a destination address in a packet header of the third IP packet is the IP address of the target device, a data part in a packet body of the third IP packet is the data part in the packet body of the first IP packet, the IoT device does not have a firewall capability, the central device has the firewall capability, and the central device is configured with the firewall rule of the IoT device.

15. The IoT device according to claim 14, wherein before the generating a first IP packet, the programming instructions are for execution by the at least one processor to cause the IoT device to:

receive a second IP packet from the central device, wherein a source address in a packet header of the second IP packet is the IP address of the central device; and obtain the IP address of the central device based on the packet header of the second IP packet.

16. The IoT device according to claim 14, wherein before the generating a first IP packet, the programming instructions are for execution by the at least one processor to cause the IoT device to:

receive a second IP packet from the central device, wherein a packet body of the second IP packet comprises an IP configuration, and the IP configuration comprises the IP address of the central device; and obtain the IP address of the central device based on the IP configuration in the packet body of the second IP packet.

17. The IoT device according to claim 16, wherein the IP configuration further comprises a tunnel identifier used to establish a tunnel between the IoT device and the central device, and the programming instructions are for execution by the at least one processor to cause the IoT device to:

establish the tunnel between the IoT device and the central device based on the tunnel identifier; and the programming instructions for execution by the at least one processor to cause the IoT device to send the first IP packet to the central device based on the IP address of the central device comprises:

the programming instructions for execution by the at least one processor to cause the IoT device to send the first IP packet to the central device based on the IP address of the central device through the tunnel.

18. The IoT device according to claim 17, wherein the tunnel identifier is used to indicate a tunnel IP address of the IoT device and a tunnel IP address of the central device, and a source address in the packet body of the first IP packet is the tunnel IP address of the IoT device.

19. The IoT device according to claim 14, wherein the programming instructions for execution by the at least one processor to cause the IoT device to generate a first IP packet comprises:

the programming instructions for execution by the at least one processor to cause the IoT device to generate the first IP packet of an application in the IoT device in response to determining that the application initiates an IP request.

\* \* \* \* \*